United States Patent [19]

Carlson et al.

[11] Patent Number: 4,526,945

[45] Date of Patent: Jul. 2, 1985

[54] LOW MOLECULAR WEIGHT POLYMERS AND COPOLYMERS

[75] Inventors: Gary M. Carlson, North Olmsted; Kirk J. Abbey, Cleveland, both of Ohio

[73] Assignee: SCM Corporation, New York, N.Y.

[21] Appl. No.: 591,804

[22] Filed: Mar. 21, 1984

[51] Int. Cl.[3] .................. C08F 4/06; C08F 220/10; C08F 120/18

[52] U.S. Cl. .................. 526/145; 526/147; 526/172; 526/329; 526/329.7; 502/162; 502/167; 502/325

[58] Field of Search ............ 526/147, 171, 172, 329.7, 526/145, 329

[56] References Cited

U.S. PATENT DOCUMENTS 3,272,786  8/1966  Perry ..................... 526/329.7 X
4,169,092  9/1979  Bayer ..................... 526/172

FOREIGN PATENT DOCUMENTS 0664434  2/1980  U.S.S.R. ..................... 526/329.7

OTHER PUBLICATIONS

N. S. Enikdopyan et al., "J. Polym. Sci.: Polym. Chem. Ed.", 19, pp. 879–889, (1981).

M. D. Johnson, "Acc. Chem. Res.", 16, pp. 343–349.

*Primary Examiner*—Paul R. Michl
*Assistant Examiner*—Fred M. Teskin
*Attorney, Agent, or Firm*—Thomas M. Schmitz

[57] ABSTRACT

The process comprises polymerizing monomers, especially including methacrylic monomer, in the presence of azo catalyst and between 0.0001% and 0.01% of Cobalt (II) dimethylglyoxime pyridine or similar Cobalt (II) complexes to produce a low molecular weight polymer or copolymer.

5 Claims, No Drawings

LOW MOLECULAR WEIGHT POLYMERS AND COPOLYMERS

BACKGROUND OF THE INVENTION

This invention pertains to a process for the preparation of low molecular weight methacrylate polymers and copolymers and particularly to the free radical polymerization of methacrylate monomers and lesser amounts of other ethylenically unsaturated monomers in the presence of a dioxime pyridine complex of Cobalt(II). The process is particularly useful for controlling molecular weights to produce low molecular weight methacrylate polymers and copolymers.

Current techniques for controlling molecular weights of polymers involve the addition of chain transfer agents, such as mercaptans, to the polymerization media. The occurrence of chain transfer to the chain transfer agent results in decreased molecular weight of the polymer formed. However, the addition of chain transfer agents can cause several problems including consumption of the chain transfer agent resulting in broad molecular weight distributions, odor problems related to the chain transfer agent and increased cost of the final product due to the chain transfer agent. A recent publication (Enikolopyan et al., J. Poly. Sci., Polm. Chem. Ed., 19, 879 1981), described the use of cobalt porphyrin complexes as catalysts for chain transfer to monomer. Each porphyrin molecule causes up to 2,000 transfer reactions compared to chain transfer agents which typically are active in only one transfer reaction. A recent journal article, "Acc. Chem. Res 16, 343 (1983) discloses the use of cobalt dimethylglyoxime complexes as catalysts in free radical reactions although polymerization reactions are not disclosed.

It now has been found that the use of very low amounts of a dimethylglyoxime (DMG) or other dioxime pyridine complexes of Cobalt(II) provides excellent chain transfer mechanisms for controlling polymer molecular weight to produce low molecular weight methacrylate polymers and copolymers. Low molecular polymer weight between about 500 and 20,000 containing between about 5 and 200 average copolymerized monomer units can be produced by polymerizing methacrylate monomers with minor amounts of other ethylenic monomers if desired in the presence of 0.001% by weight dimethylglyoxime pyridine Co(II) in combination with azo polymerization catalysts. Polymer synthesized in accordance with this invention exhibit controlled low molecular weight on the order of 500-20,000 as compared to about 100,000 in the absence of the Cobalt(II) transfer agent. The process is particularly suitable for controlling the molecular weight of methacrylate polymers and copolymers. A further advantage of the Co(II) complex is that polymers produced exhibit a much improved color. The Co(II) glyoxime is also lower cost than the porphyrin based catalysts. These and other advantages of this invention will become more apparent by referring to the detailed description of the invention and the illustrative examples.

SUMMARY OF THE INVENTION

Briefly, the invention pertains to a process for producing low molecular weight polymer and copolymers by polymerizing methacrylate monomers alone or with lesser amounts of other methacrylate monomers in the presence of azo or similar free radical catalysts in conjunction with between about 0.0001% and 0.01% by weight dimethylglyoxime pyridine complex of Cobalt-(II).

DETAILED DESCRIPTION OF THE INVENTION

The process of this invention comprises polymerizing methacrylate monomer in the presence of dimethylglyoxime complex of Cobalt II and azo catalyst to produce low molecular weight methacrylate polymers.

Referring first to the organic cobalt(II) catalyst complex, the Co(II) catalyst comprises a complex between Co(II) and a dioxime. The dioxime can be any 1,2- or 1,3-dioxime such as, but not limited to, the dioximes derived from 2,3-butanedione, 2,3-hexanedione, 2,4-heptanedione, 2,5-dimethyl-3, 4-hexanedione, 3-methyl-2, 4-hexanedione, 1,2-cyclohexanedione, 3-phenyl-2, 4-pentanedione, 2-naphthylglyoxal or camphoroquinone. Additionally, the dioxime can be derived from an aromatic dione such as, but not limited to, 4-chloro-1, 2-benzoquinone, 1,2-napthoquinone, 3-7-dimethyl-1, 2-napthoquinone, 3-chloro-1, 2-naphthoquinone or substituted 1,2-anthraquinones. A basic ligand can also be used to modify the catalyst. These basic ligands can be materials such as pyridine, triphenylphosphine or imidazole derivatives.

Referring next to the methacrylic monomers, the monomers are generally illustrated by the structure:

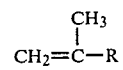

where R represents any functionality not interfering with the catalytic ability of the catalyst complex. These functionalities can include esters, including alkyl, aryl, alkylisocyanate, hydroxyalkyl, aminoalkyl, haloalkyl, and other substituted alkyl and aryl esters, methacrylic acid and its acid salts, and other derivatives of methacrylic acid including methacrylonitrile, methacrolein, methacrylamide, and 2-(2-propenyl)-oxazoline.

Methacrylic acid derivatives are ethylenically unsaturated monomers such as lower alkyl esters of methacrylic acid having an alkyl ester portion containing between 1 to 22 carbon atoms as well as aromatic derivatives of acrylic and methacrylic acid. Useful monomers include, for example, methacrylic acid, methyl methacrylate, ethyl methacrylate, butyl methacrylate, propyl methacrylate, 2-ethyl hexyl methacrylate, cyclohexyl methacrylate, decyl methacrylate, isodecyl methacrylate, benzyl methacrylate, and various reaction products such as butyl, phenyl, and cresyl glycidyl esters reacted with methacrylic acids, hydroxyl alkyl methacrylates such as hydroxyethyl and hydroxypropyl methacrylates, as well as amino methacrylates, 2-isocyanatoethyl methacrylate, and glycidyl methacrylate, N,N-dimethyl-3-propyl acrylamide, methacrylamide, dimethyl amino ethyl methacrylate.

The Co(II) glyoxime complexes are very effective chain transfer agents and very effective for controlling molecular weight in producing low molecular weight methacrylic polymers. Methacrylate monomers can be copolymerized with lesser amounts of other ethylenically unsaturated monomers wherein the polymerizable monomer mixture can contain up to about 50% other ethylenically unsaturated monomer.

Other polymerizable ethylenically unsaturated monomers contain carbon-to-carbon unsaturation and include vinyl monomers, allylic monomers, and other monomers which do not adversely affect the catalyst complex, most preferred is styrene.

In accordance with the process of this invention, methacrylic monomer can be polymerized by reacting the methacrylic derivative monomer in the presence of the Co(II) organic complex catalyst and non-reactive solvent, if desired, and free radical initiator at temperatures between 0° C. and 150° C. and preferably above 50° C. for thermal initiation. Photochemical initiation can be below 50° C. and as low as 0° if desired. Reflux temperatures for monomer mixture ordinarily are desirable. Preferred polymerization catalysts are azo catalysts such as azodiisobutyronitrile and dimethylazodiisobutyrate.

Batch polymerizations can be carried out in a nitrogen flushed reactor under a nitrogen flow. Preferably, the polymerization is carried out in the absence of oxygen or under nitrogen blanket to avoid undesirable interference of oxygen with the Co(II) catalyst. The monomer, solvent, and initiator can then be charged to the reactor. The catalyst can be formed in situ by the addition of ligand and cobalt(II) acetate tetrahydrate or chloride hexahydrate. Semi-continuous polymerizations can be carried out in a reactor equipped with a stirrer (mechanical or magnetic), thermometer, condenser, and nitrogen inlet. Solvent was charged to the reactor and flushed thoroughly with nitrogen during upheat to reflux. The initiator and monomer solution was added dropwise over approximately 2 hours.

EXAMPLE 1

The invention is the use of Co(II) complex of DMG pyridine as catalysts for the preparation of low molecular weight methacrylate polymers or copolymers. Typically, a methacrylate, ethyl acetate and a free radical initiator are added to a flask, the flask is thoroughly flushed with nitrogen and the Co(II) DMG pyridine catalyst is added. The solution is heated to reflux and held for several hours. Polymers synthesized in this manner have molecular weight as low as 625 compared to 100,000 in the absence of catalyst, in accordance with the following procedure. 27.0 ml MMA, 40 ml ethyl acetate and 0.3031 g. Vazo 64 (2,2-azobis-2-methylpropanenitrile) were added to a 100 ml flask and flushed with nitrogen. 3 ml. of a solution of catalyst, made by mixing 30 ml. of MMA, 0.0038 g. dimethyl glyoxime, 0.0087 g. Cobalt(II) acetate, and 0.10 ml. of pyridene, was added. The solution was heated to reflux (82°) and held 3 hours. The molecular weight of the final polymer (Number average) was 625. Molecular weights over 10,000 would be expected to the absence of catalyst.

EXAMPLE 2

Methylethylketone, 600 ml, was charged to a 1 liter flask and thoroughly flushed with nitrogen. To this was added 0.014 g. of $CoCl_2.6H_2O$, 0.013 g. of DMG, 0.5 ml of pyridine, and 1 ml. of 0.1 N KOH in methanol. The solution was heated to reflux and a solution of 600 g. MMA and 6 g. AIBN added over 2 hours. The solution was held 30 minutes and 0.5 g. AIBN added. An additional hold period of 30 minutes was followed by 0.5 g. of additional AIBN. After a final hold of 30 minutes, the final polymer had a Gardner-Holdt viscosity (50% in MEK) of A1 compared to Z10 in the absence of catalyst. The weight average molecular weight dropped from 20,000 to 7,500 as determined by gel permeation chromatography using polystyrene standards.

EXAMPLE 3

In a process substantially identical to Example 2 in which 0.017 g. cyclohexanedione dioxime was substituted for the DMG, the final product had reduced viscosity (50% in MEK) of A1 compared to Z10 for a similar sample with no Co complex catalyst.

EXAMPLE 4

Co(II) acetate tetrahydrate, 0.0063 g., was added to a nitrogen flushed test tube containing 25 ml. of methanol. The tube was sealed and flushed thoroughly with nitrogen and 0.825 ml. of a nitrogen purged solution of 0.1009 g. of dimethylglyoxime in 10 ml. of pyridine was added. This catalyst solution was used as a master solution for introduction of controlled quantities of catalyst into the polymerization vessels. To a test tube, used as reaction vessel, 30 ml. of methyl methacrylate and 0.3 g. azobisisobutyronitrile was added. The monomer solution was flushed thoroughly with nitrogen and enough master catalyst solution was added to give the desired catalyst concentration. The test tube was heated to 60° C. and held until polymerization occurred. The molecular weights of the final polymer are shown in Table I.

TABLE I

| Exp. # | $[c] \times 10^4$ | $Mn \times 10^3$ |
| --- | --- | --- |
| 1465-591 | — | 93.4 |
| 1465-592 | 0.25 | 88.3 |
| 1465-594 | 1.00 | 8.1 |
| 1465-595 | 1.5 | 6.9 |

EXAMPLE 5

In an experiment identical to Example 1 conducted at 70° C., the molecular weights obtained in Table II were obtained.

TABLE II

| Exp. # | $[c] \times 10^4 M$ | $Mn \times 10^3$ |
| --- | --- | --- |
| 1465-60-8 | — | 46.4 |
| 1465-60-9 | 0.25 | 33.9 |
| 1465-60-10 | 0.50 | 13.6 |
| 1465-60-11 | 1.00 | 2.3 |
| 1465-60-12 | 1.5 | 2.7 |

EXAMPLE 6

In an experiment substantially identical to Example 1 conducted at 80° C., the molecular weights obtained in Table III were obtained.

TABLE III

| Exp. # | $[c] \times 10^4 M$ | $Mn \times 10^3$ |
| --- | --- | --- |
| 1465-64-13 | — | 22.1 |
| 1465-64-14 | 0.25 | 8.0 |
| 1465-64-15 | 0.50 | 3.6 |
| 1465-64-16 | 1.00 | 7.6 |

The foregoing is illustrative of this invention and is not intended to be limiting except by the appended claims.

We claim:

1. A process for producing a low molecular weight methacrylic polymer comprising:
   copolymerizing ethylenically unsaturated monomers comprising a methacrylic monomer alone or a methacrylic monomer and other ethylenic monomer in the presence of an effective amount of free radical catalyst in combination with between 0.0001% and 0.01% Cobalt (II) glyoxime catalyst comprising a Cobalt (II) glyoxime modified by a basic ligand selected from the group consisting of pyridine, triphenylphosphine or imidazole derivatives based on the weight of said ethylenically unsaturated monomer to produce a low molecular weight methacrylate polymer having a number average molecular weight between about 500 and 20,000.

2. The process in claim 1 wherein the Cobalt(II) catalyst is a Cobalt(II) dimethylglyoxime pyridine.

3. The process in claim 1 wherein the Cobalt(II) catalyst is a Cobalt(II) dialkyl glyoxime pyridine.

4. The process in claim 1 wherein the methacrylic monomer is methacrylic acid.

5. The process in claim 1 where the methacrylic monomer comprises methyl methacrylate.

* * * * *